A. EUCHENHOFER.
GARDEN IMPLEMENT.
APPLICATION FILED JAN. 18, 1911.
1,019,773.
Patented Mar. 12, 1912.
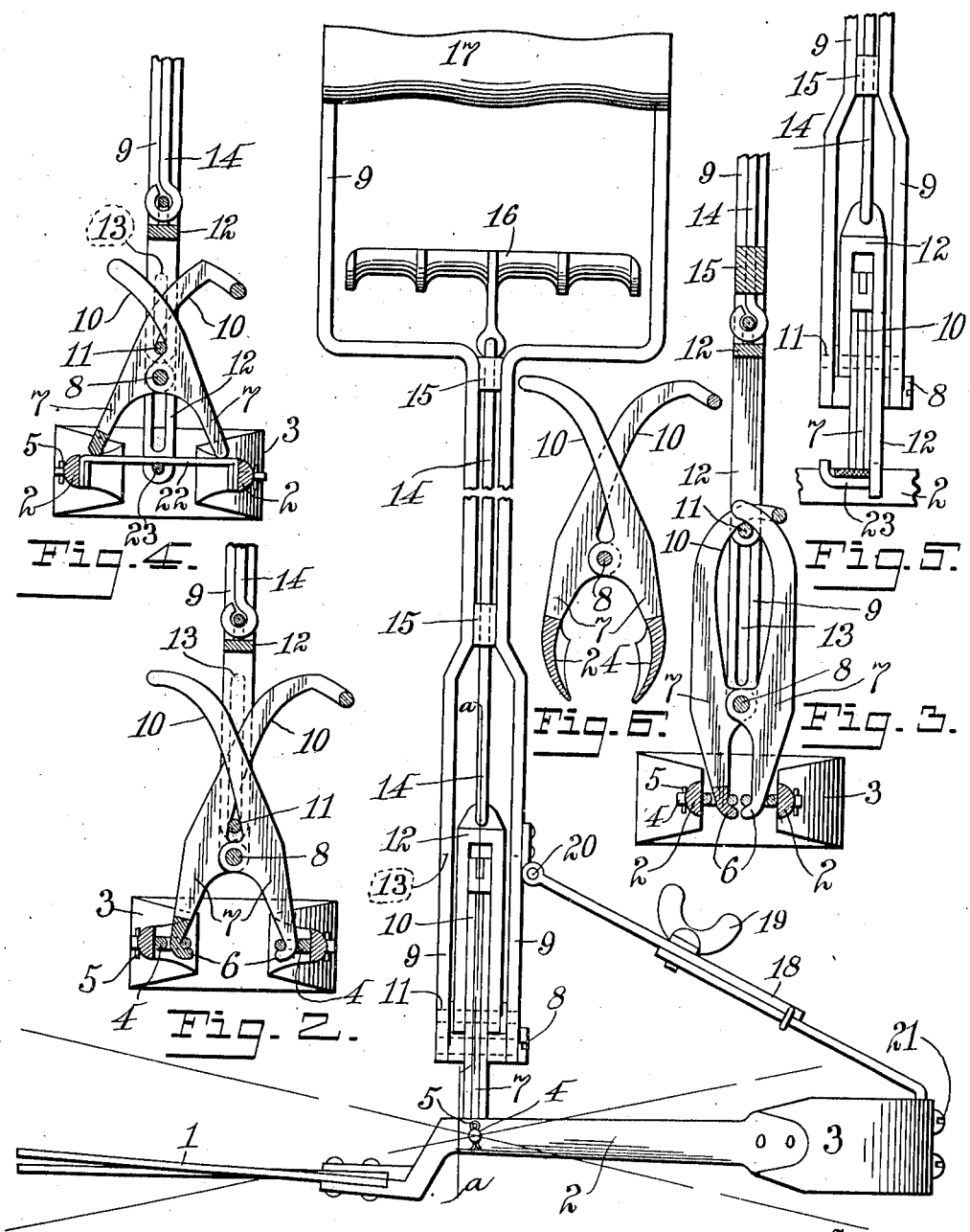

UNITED STATES PATENT OFFICE.

ALEXANDER EUCHENHOFER, OF DAYTON, OHIO.

GARDEN IMPLEMENT.

1,019,773. Specification of Letters Patent. Patented Mar. 12, 1912.

Application filed January 18, 1911. Serial No. 603,230.

*To all whom it may concern:*

Be it known that I, ALEXANDER EUCHENHOFER, a citizen of the United States, residing at Dayton, in the county of Montgomery and State of Ohio, have invented certain new and useful Improvements in Garden Implements; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in garden implements.

The object of the invention is to provide an implement adapted to be used to trim or cut grass without the necessity of the operator bending or stooping while operating the implement, and which may be conveniently operated by one hand.

Other objects of the invention will appear from the specification, and the means will be particularly pointed out in the claims.

Referring to the accompanying drawings, Figure 1 is a side elevation of the device with intermediate portions broken away; Fig. 2 is a section on the line $a-a$ of Fig. 1; Fig. 3 is a view similar to Fig. 2, showing the parts in a contracted position; Fig. 4 is a view similar to Fig. 2, showing a modification; Fig. 5 is a side elevation of the parts shown in Fig. 4; and Fig. 6 is a view of a weed extracting attachment.

Throughout the specification and drawings similar reference characters indicate corresponding parts.

Referring more particularly to the drawings, 1 designates the blades of a well known type of grass shears. These are attached to the handle portions 2, which are in turn united to a spring member 3 adapted to normally hold said blades in an open position. The blades 1 are opened and closed to secure a shearing action by the following mechanism. Each of the handle portions 2 is provided with removable eye-pieces 4 held by pins 5, and which receive the lower looped ends 6 of cam levers 7. The levers 7 are pivoted at 8 to the lower ends of vertical members 9, and said levers are further provided with cam portions 10 at their upper ends. The cam portions 10 are adapted to be engaged by a pin 11 mounted in the lower ends of a yoke 12, and the outer ends of which lie in slots 13 in the lower ends of the vertical members 9, thereby forming a guide for the yoke 12. When the yoke 12 is moved upwardly, the hooked ends 6 are moved toward each other by the pin 11 and the cams 10. This movement contracts the blades 1 and secures the shearing action. Attached to the yoke 12 is the lower end of a rod 14 which moves in guides 15 and the upper end of which is attached to a finger piece 16. The finger piece 16 is mounted below a handle 17 attached to the upper ends of the vertical members 9. The said vertical members 9 are deflected outwardly and are of a length to provide bearings for the handle 17 to be held in the hand, while the shears are in close proximity to the ground. When the device is in operation, the handle 17 is held in the palm of the hand while the member 16 is engaged by the fingers. When the members 16 are drawn upward or toward the handle 17, the rod 14 moves the yoke 12 upwardly in the guide slots 13, and the pins 11 sliding along the cams 10 will actuate the levers 7 and move the blades 1 toward each other. When the member 16 is released, the spring 3 will move the blades 1 outwardly, and owing to the peculiar shape of the cams 10, said cams will engage the pin 11 and draw the yoke 12, rod 14 and finger member 16 downwardly.

The connection between the looped ends 6 of the levers 7 and the eye-pieces 4, are in the nature of pivots which allow the shears to be placed at an angle when the device is being used on a terrace or slope. The shears are held in their various positions by an adjustable brace 18 provided with a thumb screw 19 and pivotally attached at one end 20, to the vertical members 9. The opposite end of the brace 18 is attached to the spring 3 by any suitable means such as screws 21. The shears may be detached from the levers 7 and the brace 18 by removing the pins 5 and the screws 21. This allows said shears to be used by themselves, if desired.

In Fig. 4 is shown a modified construction, in which the handle portions 2 are connected by a flexible band 22, and one of the legs of the yoke 12 is extended downwardly and provided with a hook 23 which engages the under side of the flexible band 22. In this construction the ends of the levers 7 engage the top of the flexible member 22 and act as guides for said member. When the yoke 12 is drawn upwardly, the flexible member 22 is folded by the hook 23 and the guides 7; this will draw the handle members 2 and the blades 1 of the shears toward each other.

In Fig. 6 is shown an attachment which may by used to extract weeds. In this device the lower ends of the levers 10 are provided with grippers 24 which may be integral portions thereof. When this device is used, the shears are detached and the levers 7 shown in Fig. 6 are substituted for those shown in Figs. 1 and 2. The grippers 24 are placed over the head or top of the weed and pressed into the earth, and when the finger member 16 is moved upwardly, the grippers 24 will be contracted and the lower edges thereof will engage the head or top of the weed, and extract the same.

Having described my invention, I claim:

1. In a device of the type specified, the combination with a supporting member, of levers pivotally connected to said supporting member and having extended portions which normally lie across each other, a pair of blades attached to said levers and operated thereby, means maintaining said blades normally open, a yoke slidingly mounted in said supporting member, said yoke having a portion lying between the extensions of said levers and above the pivotal point of said levers and adapted to actuate said levers to operate the blades, and a handle connected to said yoke whereby said yoke is actuated, substantially as specified.

2. In a device of the type specified, the combination with a supporting member, and a pair of shears mounted at one end thereof, means for maintaining said shears normally open, of levers pivoted to one end of said supporting member, and attached to opposite sides of said shears, said levers having extensions which normally cross each other above their fulcrum, a yoke slidingly mounted on said supporting member and adapted to actuate said levers, by engaging said levers above the point of their fulcrum, and means for actuating said yoke to actuate said shears.

3. In a device of the type specified, the combination with a supporting member, a pair of shears mounted at one end thereof, and means for maintaining said shears normally open, of levers having extensions pivoted to said supporting member and attached to opposite sides of the shears, a yoke slidingly mounted on said supporting member and adapted to actuate said levers by engaging the extensions thereof, means for actuating said yoke to operate the shears, and an adjustable brace between said shears and said supporting member, whereby the position of the shears may be adjusted.

4. In a device of the type specified, the combination with a supporting member, a pair of shears pivoted thereto, and means for maintaining said shears normally open, of a pair of levers pivoted to said supporting member and connected to the opposite members of said shears, said levers having overlapping extensions which form an angle above their pivot, a reciprocating hand piece adapted to engage said levers within the angle above their pivot and to actuate said shears, and an adjustable brace member between said supporting member and said shears.

In testimony whereof I affix my signature in presence of two witnesses.

ALEXANDER EUCHENHOFER.

Witnesses:
MATTHEW SIEBLER,
R. J. McCARTY.